(12) United States Patent
Von Lehmann

(10) Patent No.: US 11,892,059 B2
(45) Date of Patent: Feb. 6, 2024

(54) ECCENTRIC GEARING

(71) Applicant: Maxon International AG, Sachseln (CH)

(72) Inventor: Ernst Von Lehmann, Glottertal (DE)

(73) Assignee: MAXON INTERNATIONAL AG, Sachseln (CH)

( * ) Notice: Subject to any disclaimer, the term of this patent is extended or adjusted under 35 U.S.C. 154(b) by 302 days.

(21) Appl. No.: 17/292,909

(22) PCT Filed: Nov. 12, 2019

(86) PCT No.: PCT/EP2019/081015
§ 371 (c)(1),
(2) Date: May 11, 2021

(87) PCT Pub. No.: WO2020/099399
PCT Pub. Date: May 22, 2020

(65) Prior Publication Data
US 2022/0003296 A1    Jan. 6, 2022

(30) Foreign Application Priority Data
Nov. 13, 2018  (EP) .................................. 18206043

(51) Int. Cl.
*F16H 1/32* (2006.01)
*F16H 55/17* (2006.01)

(52) U.S. Cl.
CPC ............... *F16H 1/32* (2013.01); *F16H 55/17* (2013.01); *F16H 2001/323* (2013.01); *F16H 2001/327* (2013.01)

(58) Field of Classification Search
CPC .... F16H 1/32; F16H 2049/003; F16H 49/001; F16H 2001/327; F16H 2001/323; F16H 55/17
See application file for complete search history.

(56) References Cited

U.S. PATENT DOCUMENTS 1,543,791 A    6/1925  Pitter
3,068,719 A   12/1962  Singelmann
(Continued)

FOREIGN PATENT DOCUMENTS

CN    110748610 A    2/2020
EP    3364071 A2    8/2018
(Continued)

OTHER PUBLICATIONS

International Search Report (PCT/ISA/210) and Written Opinion (PCT/ISA/237) dated Jan. 2, 2020, by the European Patent Office as the International Searching Authority for International Application No. PCT/EP2019/081015.

(Continued)

*Primary Examiner* — Gregory Robert Weber
(74) *Attorney, Agent, or Firm* — BUCHANAN INGERSOLL & ROONEY PC

(57) ABSTRACT

The present disclosure relates to an eccentric gearing having a first gearing element, which has a first axis and an outer contour having at least one cam, and having a second gearing element, which has a second axis which is constantly held eccentrically in relation to the first axis. The first gearing element is rotatable relative to the second gearing element, and the second gearing element is supported on the outer contour of the first gearing element such that a rotation of the first gearing element effects a rotation of the second axis of the second gearing element about the first axis. The first gearing element has a number N of cams protruding radially, and uniformly distributed in the circumferential direction, in relation to the first axis. The second gearing element is supported at N+1 contact points of the first gearing element, wherein N is at least two.

20 Claims, 10 Drawing Sheets

(56) References Cited

U.S. PATENT DOCUMENTS 11,441,642 B2 * 9/2022 Tory ............... F16H 49/001
2018/0291996 A1 * 10/2018 Fan ............... F16H 55/17

FOREIGN PATENT DOCUMENTS

| JP | S54118549 U | 8/1979 |
| JP | S59141775 A | 8/1984 |
| JP | H0165968 U | 4/1989 |

OTHER PUBLICATIONS

Office Action (Decision to Grant a Patent) dated Oct. 31, 2023, by the Japanese Patent Office in corresponding Japanese Patent Application No. 2021-525860, and an English Translation of the Office Action. (3 pages).

* cited by examiner

ECCENTRIC GEARING

BACKGROUND

A generic eccentric gearing comprises a first gearing element, which has a first axis and an outer contour having at least one cam protruding radially in relation to the first axis, and a second gearing element, which has a second axis which is constantly held eccentrically in relation to the first axis, wherein the first gearing element is mounted in a rotatable manner about the first axis relative to the second gearing element, and wherein the second gearing element is supported on the outer contour of the first gearing element such that a rotation of the first gearing element about the first axis effects a rotation of the second axis of the second gearing element about the first axis.

An eccentric gearing is known, for example, from EP 3364071 A2. This gearing is a cycloidal gearing. The first gearing element is formed by a crankshaft which comprises a circular eccentric cam and, via this cam, drives a cycloidal disk whose external toothing engages in the internal toothing of a ring gear. The cycloidal disk thus forms a second gearing element. The cycloidal gearing known from EP 3364071 A2 altogether includes four cycloidal disks, each driven via a separate eccentric cam.

A basic challenge in the designing and construction of cycloidal gearings is to design the gearing such that no unbalances occur. A cycloidal gearing can only be free of unbalances as of three gear rims or cycloidal disks arranged one behind the other and operating in an offset manner. The crankshaft also has to comprise at least three eccentric cams, and the cycloidal disks have to be mounted on the corresponding eccentric cams via one separate ball bearing each. Thereby, altogether relatively many parts are required, and the gearing is relatively large altogether. In particular, a relatively long overall length is reached. Due to the high number of components, the gearing is moreover expensive and involves quite some efforts for its manufacture.

Furthermore, U.S. Pat. No. 3,068,719 discloses a gearing with a first gearing element in the form of an output shaft, and with a second gearing element in the form of a chain belt. Three eccentric regions are embodied at the output shaft, two of these eccentric regions being arranged identically, and the third eccentric region being arranged offset by 180° relative to the other two eccentric regions. On each of the eccentric regions of the output shaft, arms projecting to the outside (spider assemblies) against which the chain belt abuts are arranged. Since the one eccentric region is offset relative to the other two eccentric regions, the flexible chain belt is elliptically deformed. The chain belt furthermore comprises teeth projecting to the outside which engage into the teeth of a stationary ring gear due to the elliptical deformation, the ring gear comprising a higher number of teeth than the chain belt. The gearing furthermore comprises an input shaft firmly connected to a gearwheel. A rotary motion of the input shaft is transmitted, via the gearwheel, the ring gear, the chain belt, and the eccentric elements of the output shaft and the arms arranged thereon, into a rotary motion of the output shaft in the opposite direction. Since the chain belt is elliptically deformed, it has no second axis which, during a rotation of the first gearing element about the first axis, also rotates about the first axis.

JP S59 141775 shows a harmonic drive gearing coupled to a hydraulic motor. A rotor of the hydraulic motor comprises a first gearing element in the form of two thrust pieces to which a pressurized liquid can be applied. Thereby, the thrust pieces are pressed against the inner circumferential surface of a second gearing element, of a flexible gearwheel, and result in an elastic deformation of the flexible gearwheel also at two points. This means, the gearwheel is elliptically deformed and thereby engages a ring gear at two points of its circumference. When the rotor is rotating, the points where the thrust pieces come into contact with the flexible gearwheel will be shifted and transmit the rotation of the rotor to an output shaft. The thrust pieces are not embodied as cams but have an irregular surface. Here, too, the second gearing element does not comprise a second axis which, during a rotation of the first gearing element about the first axis, also rotates about the first axis.

SUMMARY

It is therefore the object of the present invention to provide an eccentric gearing of the generic type which is constructed in an essentially simpler way, has a compact design, and is cheaper to manufacture.

Accordingly, in an eccentric gearing, a solution of the problem according to the invention is provided if the outer contour of the first gearing element comprises a number N of cams protruding radially in relation to the first axis, which cams are arranged so as to be distributed uniformly in the circumferential direction in relation to the first axis, wherein the second gearing element is supported at N+1 contact points on the outer contour of the first gearing element, and wherein the number N is at least two. Preferably, the number of contact points of the second gearing element is exactly N+1.

The solution according to the invention has the advantage that the first gearing element can be inherently free of unbalances. Moreover, by one and the same outer contour of the first gearing element, a plurality of successively arranged second gearing elements operating offset with respect to each other can be driven. The number of required components and the fabrication and assembly efforts are reduced. The gearing can be kept very compact.

The contact points are preferably uniformly distributed in the circumferential direction in relation to the second axis. If there is a direct contact between the outer contour of the first gearing element and the second gearing element, the contact points travel, during the rotation of the first gearing element, about the first axis along the outer contour of the first gearing element. In a further preferred way, the outer contour of the first gearing element is convex across the complete circumference.

Advantageous embodiments of the present invention are the subject matter of the subclaims.

According to a particularly preferred embodiment of the present invention, the outer contour of the first gearing element is formed by a closed trochoid with N cycles. The trochoid is, in a further preferred way, an epitrochoid or an epicycloid. This embodiment ensures that the second gearing element abuts against the outer contour of the first gearing element free from backlash across the whole operating range in all contact points.

According to a further embodiment of the present invention, the second gearing element comprises N+1 contact cams which are arranged so as to be distributed uniformly in the circumferential direction in relation to the second axis of the second gearing element and point to the second axis, the second gearing element being supported on the outer contour of the first gearing element via the contact cams at N+1 contact points. Between the contact cams, the second gearing element preferably comprises amply dimensioned recesses, so that it is avoided that the outer contour of the first gearing element comes into contact with an inner contour of the second gearing element between the contact cams. A particularly simple embodiment results if the contact cams comprise, at least in a region where the corresponding contact point can come to rest, a circular contour convex with respect to the second axis.

In a particularly preferred way, the outer contour of the first gearing element is, in this embodiment, surrounded by an elastically deformable sleeve which is mounted, via a plurality of rolling elements arranged between the first gearing element and the sleeve, in a rotatable manner with respect to the first gearing element, wherein the contact cams abut against an outer circumference of the sleeve at the contact points, so that the second gearing element is indirectly supported on the outer contour of the first gearing element via the contact cams. Due to the rotatable mounting of the sleeve on the outer contour of the first gearing element, the sleeve does not necessarily rotate along with the first gearing element. The elastically deformable sleeve is continuously deformed during the rotation of the first gearing element like a flex spline of a harmonic drive gearing. In this way, a relative movement between the sleeve and the contact cams of the second gearing element can be prevented. This in turn leads to a low-friction operation of the eccentric gearing according to the invention. In this embodiment, it is of particular advantage if the outer contour of the first gearing element is convex across the complete circumference. This is the only way to ensure that the elastically deformable sleeve reproduces the shape of the outer contour of the first gearing element in an exactly parallel manner. Between the outer contour of the first gearing element and the inner circumference of the sleeve, there is a constant distance which is determined by the diameter of the rolling elements arranged therebetween. The rolling elements are preferably rollers or balls.

According to an alternative embodiment of the present invention, the eccentric gearing N+1 comprises rollers mounted in a rotatable manner at the second gearing element which are arranged so as to be uniformly distributed in the circumferential direction in relation to the second axis of the second gearing element and roll directly on the outer contour of the first gearing element in the contact points. In this embodiment, no elastically deformable sleeve is required. The flexing work done during the deformation of the sleeve is eliminated, which can reduce friction altogether. The efficiency is therefore correspondingly high in this embodiment. However, this embodiment requires a somewhat more complicated design of the second gearing element. The second gearing element is in this embodiment preferably composed of a plurality of segments. For example, one segment of the second gearing element per roller can be provided. The design of the second gearing element composed of a plurality of segments offers, among other things, the advantage that even if only one single second gearing element is used, a system free of unbalances can be set up.

According to a further, particularly preferred embodiment of the present invention, the number N corresponds to the number two. On the one hand, the outer contour of the first gearing element can be relatively easily fabricated thereby. On the other hand, this results in a relatively high gearing-down.

According to a further preferred embodiment of the present invention, the second gearing element is a gear rim which comprises a toothing with a first pitch, which engages in a toothing of a ring gear with a second pitch, the first pitch being larger than the second pitch. Preferably, the eccentric gearing is in this embodiment designed as a cycloidal gearing, wherein the gear rim is designed as a cycloidal disk. This means that the toothing of the gear rim is also formed by a closed trochoid.

In a further preferred way, the gear rim comprises, in this embodiment, a toothing with a first number of teeth, wherein the ring gear comprises a toothing with a second number of teeth, wherein the first number of teeth is smaller than the second number of teeth, provided that the toothing is complete. The actual number of teeth of the ring gear toothing can be lower as not every tooth has to be necessarily formed. For example, only every second tooth can be actually present.

The teeth of the toothing of the ring gear can be designed as a cylindrical bolt in a modification of this embodiment, in particular if the second gearing element is designed as a cycloidal disk.

The second gearing element designed as a gear rim comprises, in a further preferred way, a through-opening in which the first gearing element is arranged and which comprises the contact cams mentioned above in a further preferred way.

In a further preferred way, the eccentric gearing comprises a support mounted in a rotatable manner relative to the ring gear and having pins extending in parallel to its axis which each slide or roll along at the circumference of a corresponding bore of the gear rim during a rotation of the second axis of the gear rim about the first axis of the first gearing element. The pins of the support and the corresponding bores of the gear rim are preferably each arranged so as to be uniformly distributed in the circumferential direction. In a further preferred way, altogether six pins and bores each are provided. During a rotation of the first gearing element, the support performs a uniform rotary motion and can be used as an output of the eccentric gearing if the first gearing element forms an input of the eccentric gearing and the ring gear is retained.

To keep the eccentric gearing according to the invention free of unbalances, in a further preferred way, at least three gear rims arranged one behind the other are provided which each are supported at N+1 contact points on the outer contour of the first gearing element, the second axes of the gear rims being correspondingly offset with respect to each other in relation to the first axis of the first gearing element.

In a particularly preferred embodiment, the eccentric gearing comprises four gear rims arranged one behind the other which are each supported at N+1 contact points on the outer contour of the first gearing element, the second axes of the two outer gear rims being offset by 180° with respect to the second axes of the two central gear rims in relation to the first axis of the first gearing element. The two outer gear rims and the two central gear rims each move synchronously. This embodiment prevents a tilting of the gear rims in the transmission of major forces.

According to yet a further embodiment, a rotation of the first gearing element about the first axis can effect a rotation of the second gearing element about the second axis. Thereby, the second axis rotates about the first axis, and the desired output movement is achieved.

In an efficient embodiment, the second gearing element can be embodied to be rigid. A contact of the first gearing element with the second gearing element does therefore not result in any deformation of the second gearing element. A rotation of the first gearing element is therefore transmitted to the second gearing element and results in the second gearing element also rotating. The contact between the first gearing element and the second gearing element can be effected directly or indirectly.

According to a further preferred embodiment of the present invention, the gear rim which forms the second gearing element is made of steel. As an alternative, the gear rim can also be made of ceramics.

BRIEF DESCRIPTION OF THE DRAWINGS

Embodiments of the present invention will be illustrated more in detail below with reference to drawings.

In the drawings.

DETAILED DESCRIPTION

Figure 1:
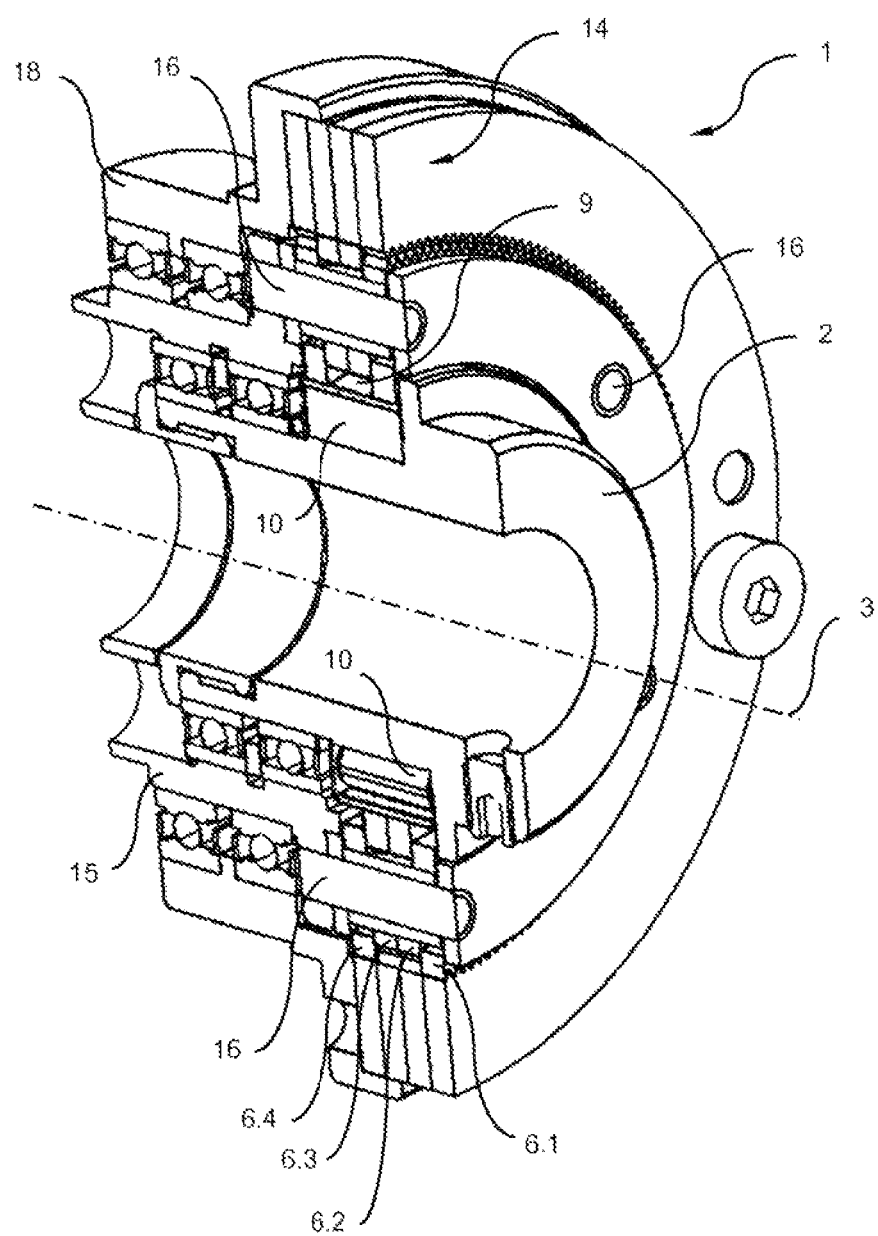
FIG. 1 shows a perspective longitudinal section through an eccentric gearing according to the invention according to first exemplified embodiment.
Figure 2:
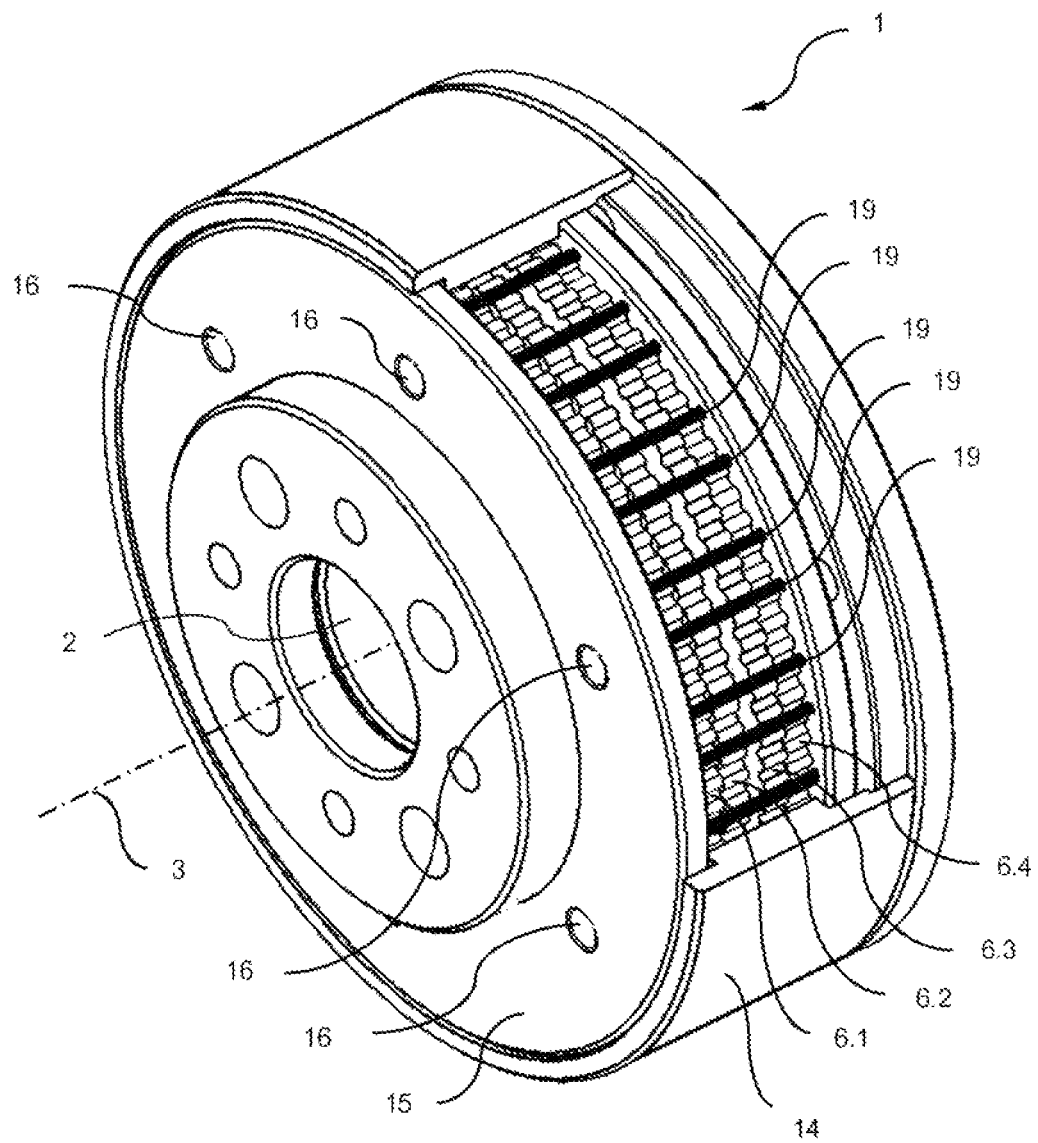
FIG. 2 shows a partially sectional perspective view of an eccentric gearing according to the invention according to a second embodiment.

In the following illustrations, equal parts are designated by equal reference numerals. If a figure contains reference numerals which are not explicitly discussed in the pertaining description of the figures, reference is made to previous or following descriptions of the figures.

FIG. 1 shows an eccentric gearing 1 according to the invention according to a first embodiment of the present invention. The inner hollow shaft 2 forms, in this eccentric gearing, the input shaft and simultaneously a first gearing element in the sense of the present invention. It comprises a first axis 3 which is arranged concentrically to the shaft 15 and mounted in a rotatable manner with respect to the shaft 15. The shaft 15 forms the output shaft of the gearing and is itself mounted in a rotatable manner with respect to a housing 18 of the eccentric gearing 1 according to the invention. The shaft 15 simultaneously serves as a support of altogether four gear rims 6.1, 6.2, 6.3 and 6.4 which are in entraining engagement with the first gearing element 2 and each comprise an external toothing engaging in an internal toothing of a corresponding ring gear 14 connected to the housing. The shaft 15 serving as a support to this end comprises altogether six pins 16 arranged so as to be uniformly distributed in the circumferential direction, and which are received in corresponding bores 17 (see FIG. 3) of the gear rims 6.1 to 6.4.

The functioning of the eccentric gearing shown in FIG. 1 corresponds to the second embodiment shown in FIGS. 2 to 11 which principally only differs from the first embodiment in that the teeth of the internal toothing of the ring gear 14 are formed by cylindrical bolts 19 (see in particular FIGS. 2 and 3), the external toothing of the four gear rims 6.1 to 6.4 being formed by a closed trochoid. In the first and second embodiments, the eccentric gearing according to the invention is therefore embodied as a cycloidal gearing. For the sake of good order, it is pointed out that only every second to third tooth of the internal toothing of the ring gear 14 is actually realised. For the further illustration of the invention, the second embodiment is considered below.

Figure 3:
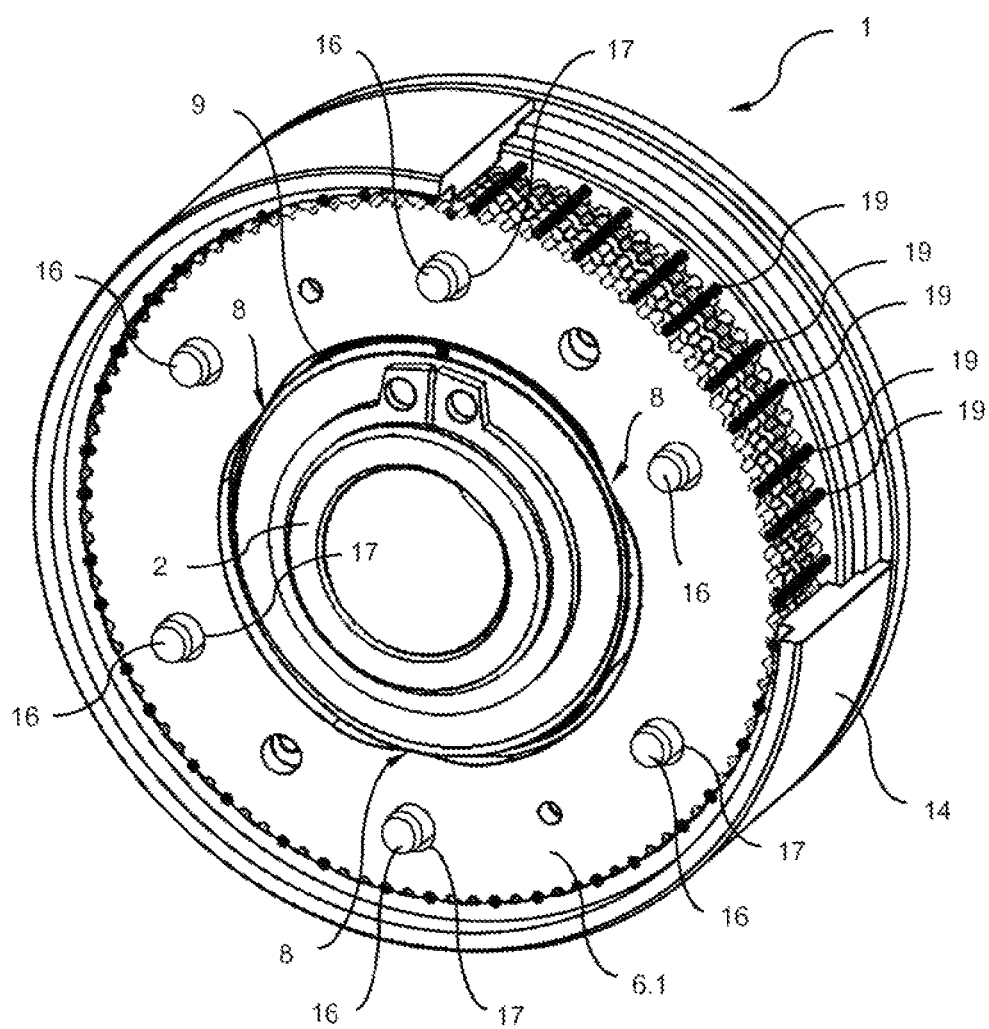
FIG. 3 shows a further perspective view of the eccentric gearing according to the invention of FIG. 2 in a partially opened state.
Figure 4:
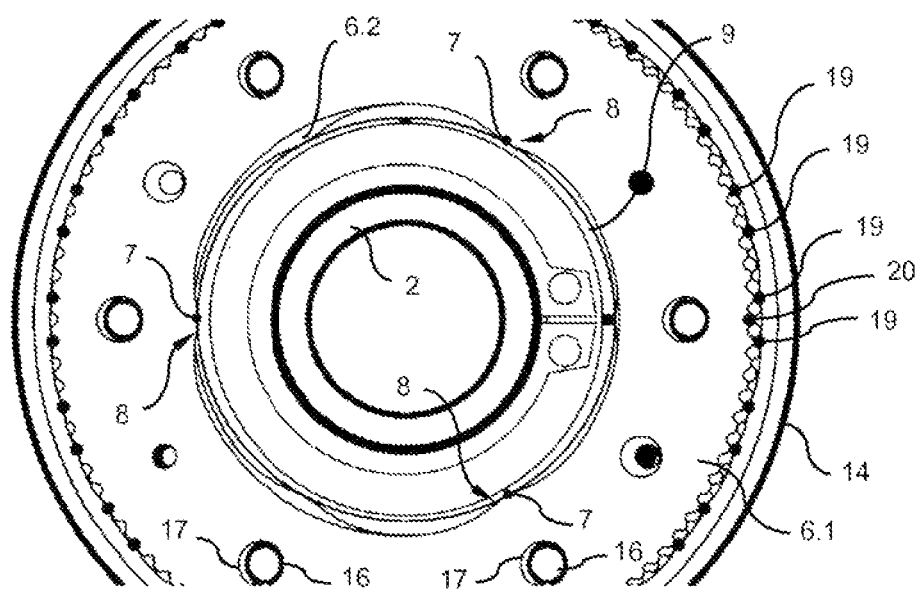
FIG. 4 shows a view of the eccentric gearing of FIG. 3 parallel to its axis.
Figure 5:
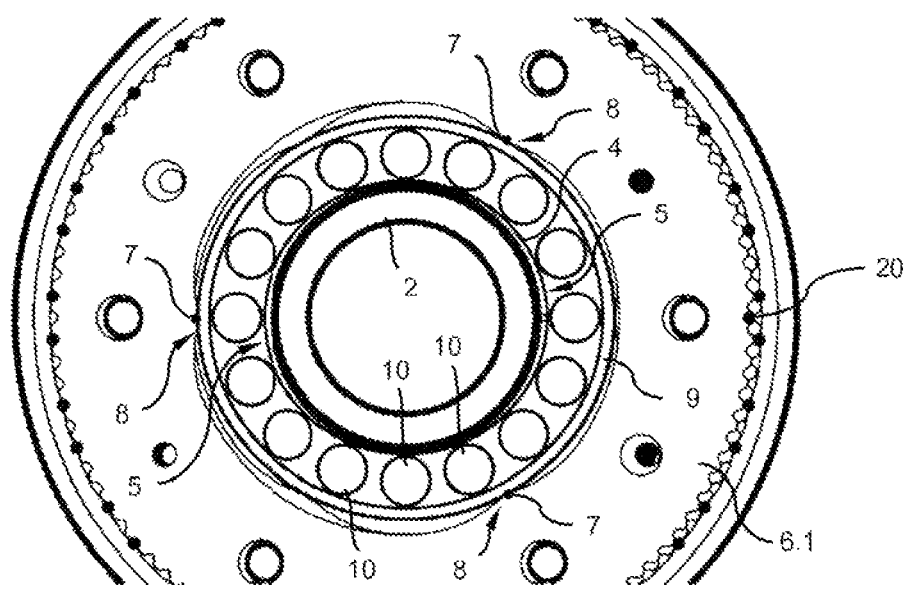
FIG. 5 shows the view of FIG. 4 with an opened roller bearing between the first gearing element and the elastically deformable sleeve.
Figure 6:
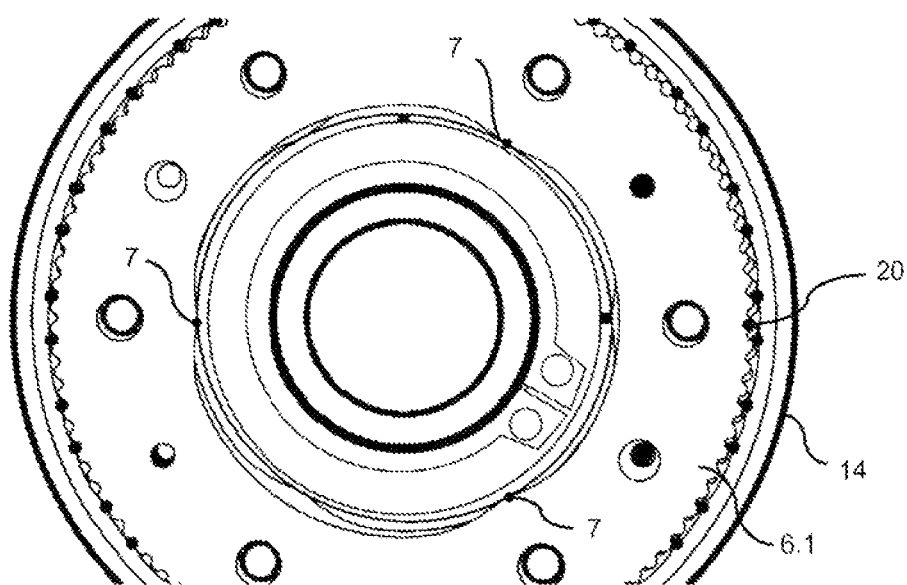
FIG. 6 shows the view of FIG. 4 with a first gearing element rotated about 30° with respect to the original position shown in FIG. 4.
Figure 7:
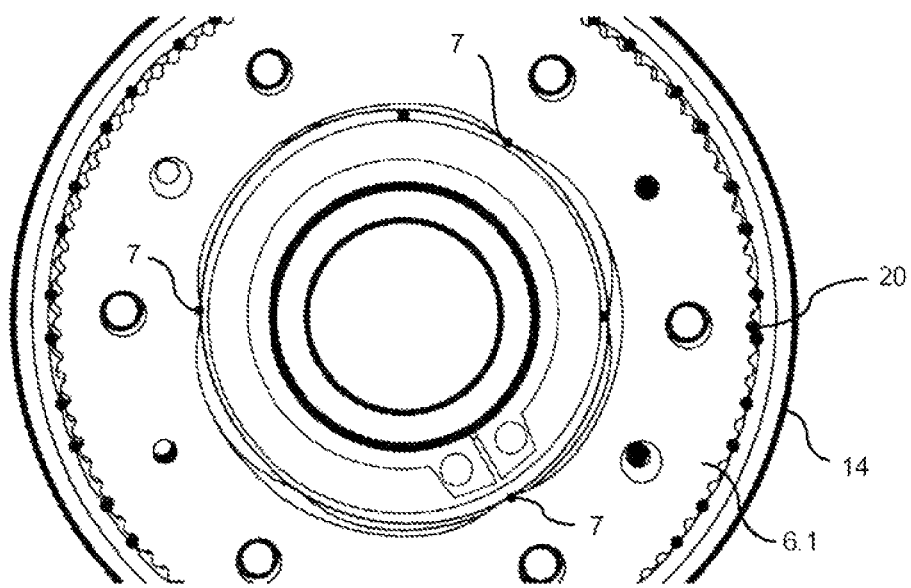
FIG. 7 shows the view of FIG. 4 with a first gearing element rotated about 60° with respect to the original position shown in FIG. 4.
Figure 8:
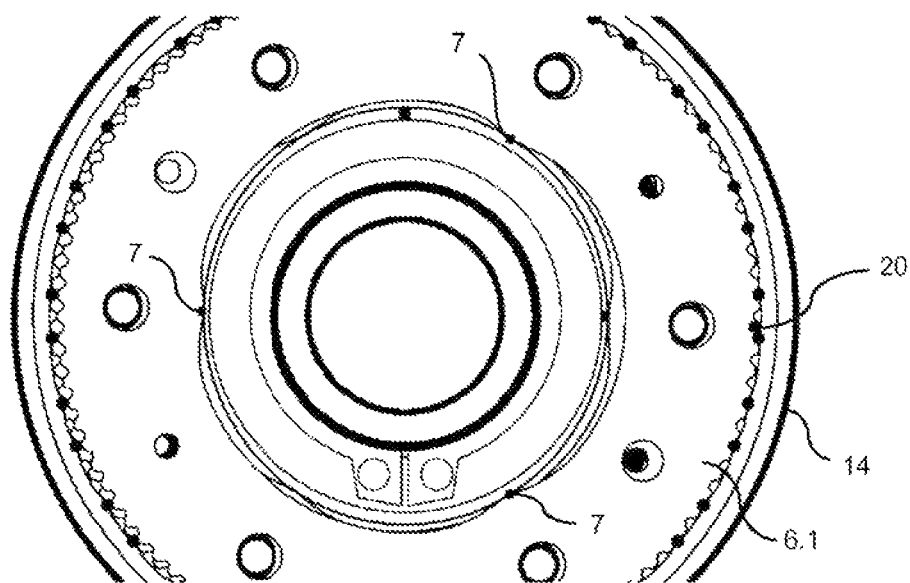
FIG. 8 shows the view of FIG. 4 with a first gearing element rotated about 90° with respect to the original position shown in FIG. 4.
Figure 9:
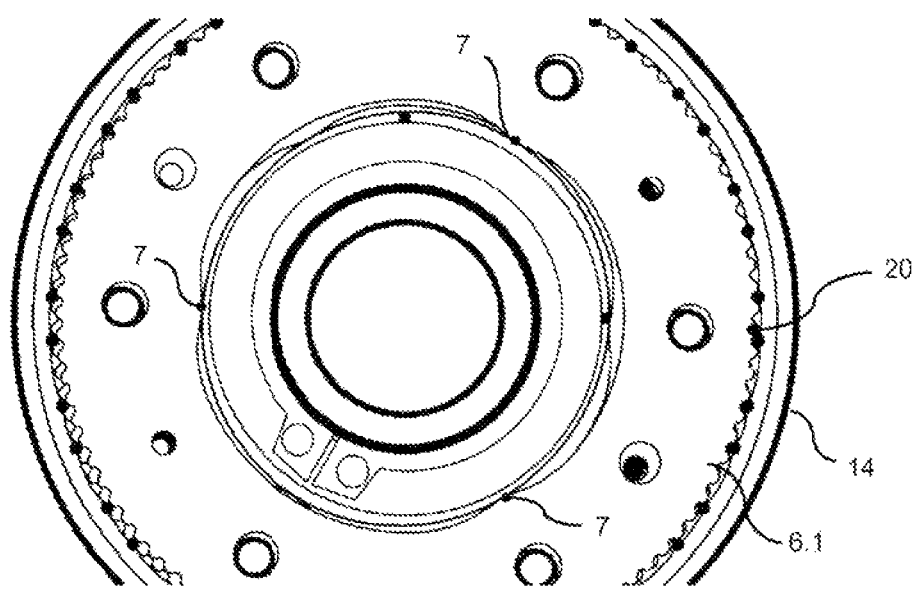
FIG. 9 shows the view of FIG. 4 with a first gearing element rotated about 120° with respect to the original position shown in FIG. 4.
Figure 10:
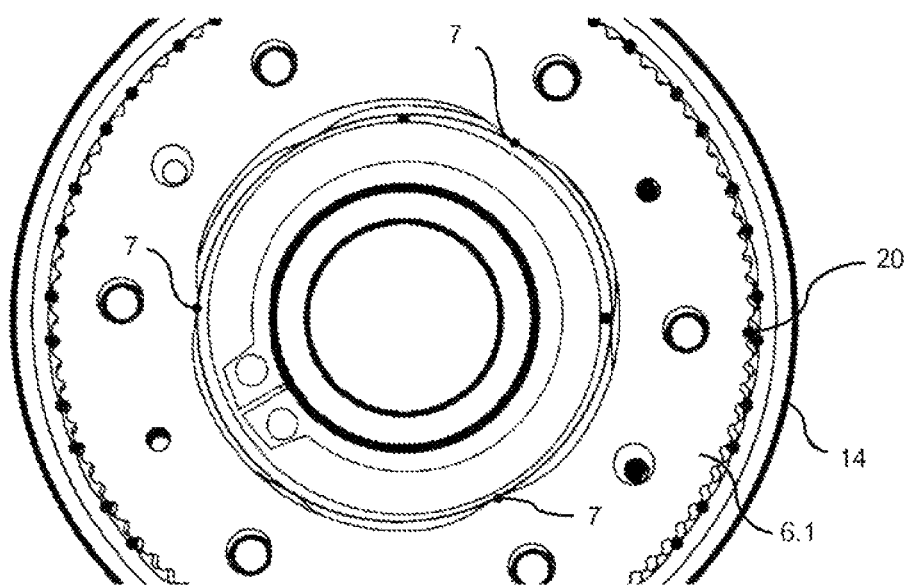
FIG. 10 shows the view of FIG. 4 with a first gearing element rotated about 150° with respect to the original position shown in FIG. 4.

In FIG. 3 and the following FIGS. 4 to 11, the front part of the support 15 is removed, so that there is an unobstructed view onto the interior of the gearing. As in particular FIGS. 3 and 4 show, the external toothing of the gear rims 6.1 to 6.4 comprises one tooth less than the internal toothing of the ring gear 14, as it is common with cycloidal gearings. The axes of the four gear rims are constantly kept eccentrically in relation to the axis 3 of the first gearing element 2. In the present invention, however, this is not achieved by a simple eccentric. In FIG. 5, one can see that the first gearing element comprises, in the region of the gear rims, an outer contour 4 with two cams 5 protruding radially and arranged offset with respect to each other by 180°. The outer contour 4 of the first gearing element results by an epitrochoid with two cycles. Each one of the four gear rims 6.1 to 6.4 has an inner contour with altogether three contact cams 8 arranged so as to be uniformly distributed in the circumferential direction and facing inwards. Between the outer contour 4 of the first gearing element 2 and the inner contour of each gear rim, an elastically deformable sleeve 9 is arranged which is mounted in a rotatable manner with respect to the first gearing element via a plurality of rolling elements 10 arranged between the first gearing element and the sleeve, and which, during the rotation of the first gearing element 2, deforms like a flex spline of a harmonic drive gearing. The elastically deformable sleeve 9 thus constantly adopts the shape of the outer contour 4 of the first gearing element 2 (extended in parallel). The contact cams 8 of each gear rim abut against the outer circumference of the sleeve 9 at the three contact points 7, so that the gear rims 6.1 to 6.4 are indirectly supported via the contact cams 8 on the outer contour 4 of the first gearing element 2. A rotation of the first gearing element 2 about the first axis 3 thus leads to a rotation of the gear rims 6.1, 6.2, 6.3, 6.4, that means of the second gearing element, about the axes of the four gear rims 6.1, 6.2, 6.3, 6.4, that means of the second axes, and thus also to a rotation of the second axes about the first axis 3.

Figure 11:
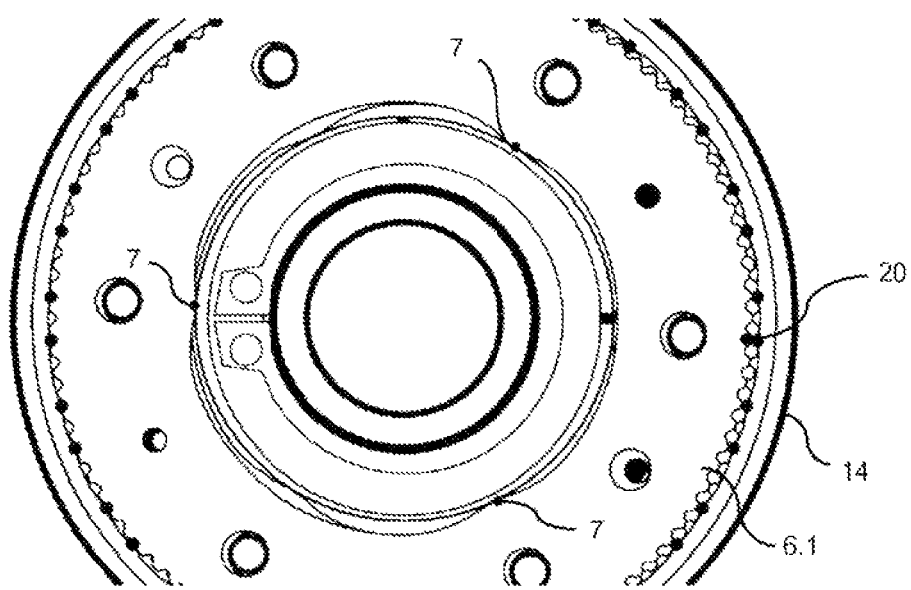
FIG. 11 shows the view of FIG. 4 with a first gearing element rotated about 180° with respect to the original position shown in FIG. 4.

FIGS. 6 to 11 show the view of FIG. 4, wherein the first gearing element 2 has been rotated stepwise about 30° each with respect to the position shown in the respective preceding figure. FIG. 11 thus shows a position of the first gearing element 2 rotated about 180° with respect to the original position. With reference to the marking point 20 on a tooth of the external toothing of the first gear rim 6.1, one can clearly see that the first gear rim 6.1 is rotatably offset by one tooth of the internal toothing of the ring gear 14 in the process. The gear rim 6.1 here undergoes a swaying movement which is translated, via the engagement between the bores 17 of the gear rim and the pin 16 of the support 15, into a continuous rotary motion of the support 15.

In the shown embodiment, the axes of the two outer gear rims 6.1 and 6.4 are offset in relation to the axis 3 of the first gearing element 2 with respect to the axes of the two inner gear rims 6.2 and 6.3 by 180°. The two outer gear rims and the two inner gear rims each operate synchronously. For this reason, in FIGS. 4 to 11, only the gear rims 6.1 and 6.2 can be seen.

Figure 12:
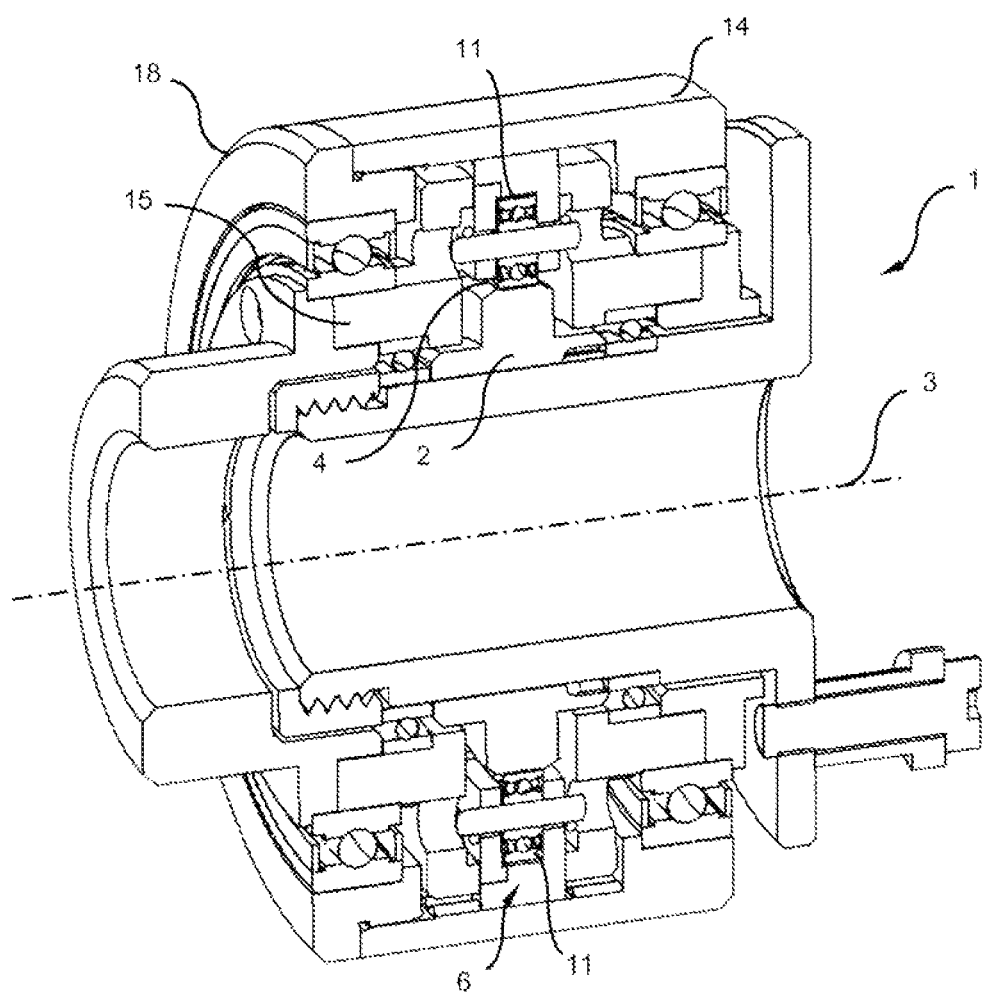
FIG. 12 shows a perspective longitudinal section through an eccentric gearing according to the invention according to a third exemplified embodiment.
Figure 13:
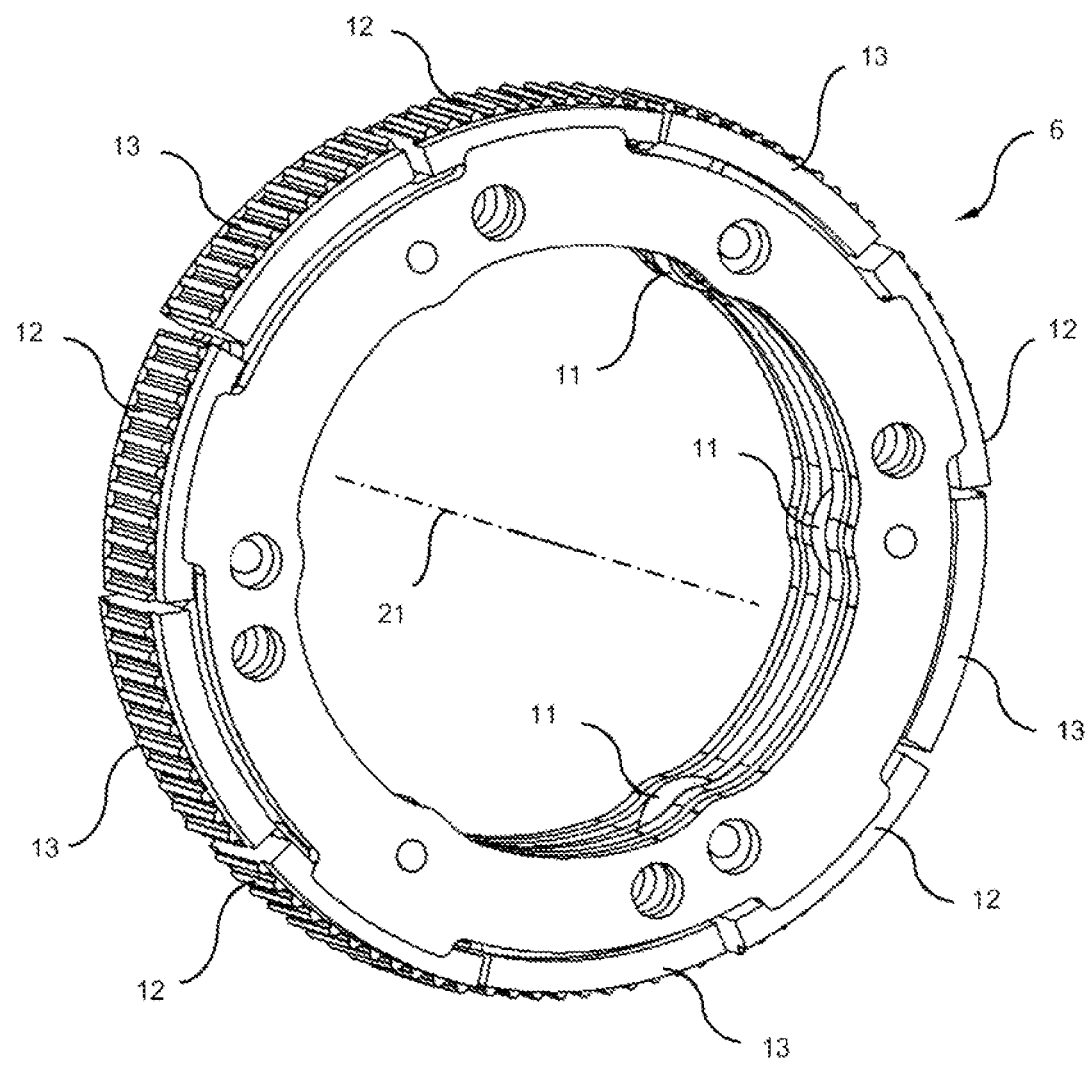
FIG. 13 shows a perspective detailed view of a possible second gearing element of the eccentric gearing according to the invention of FIG. 12.
Figure 14:
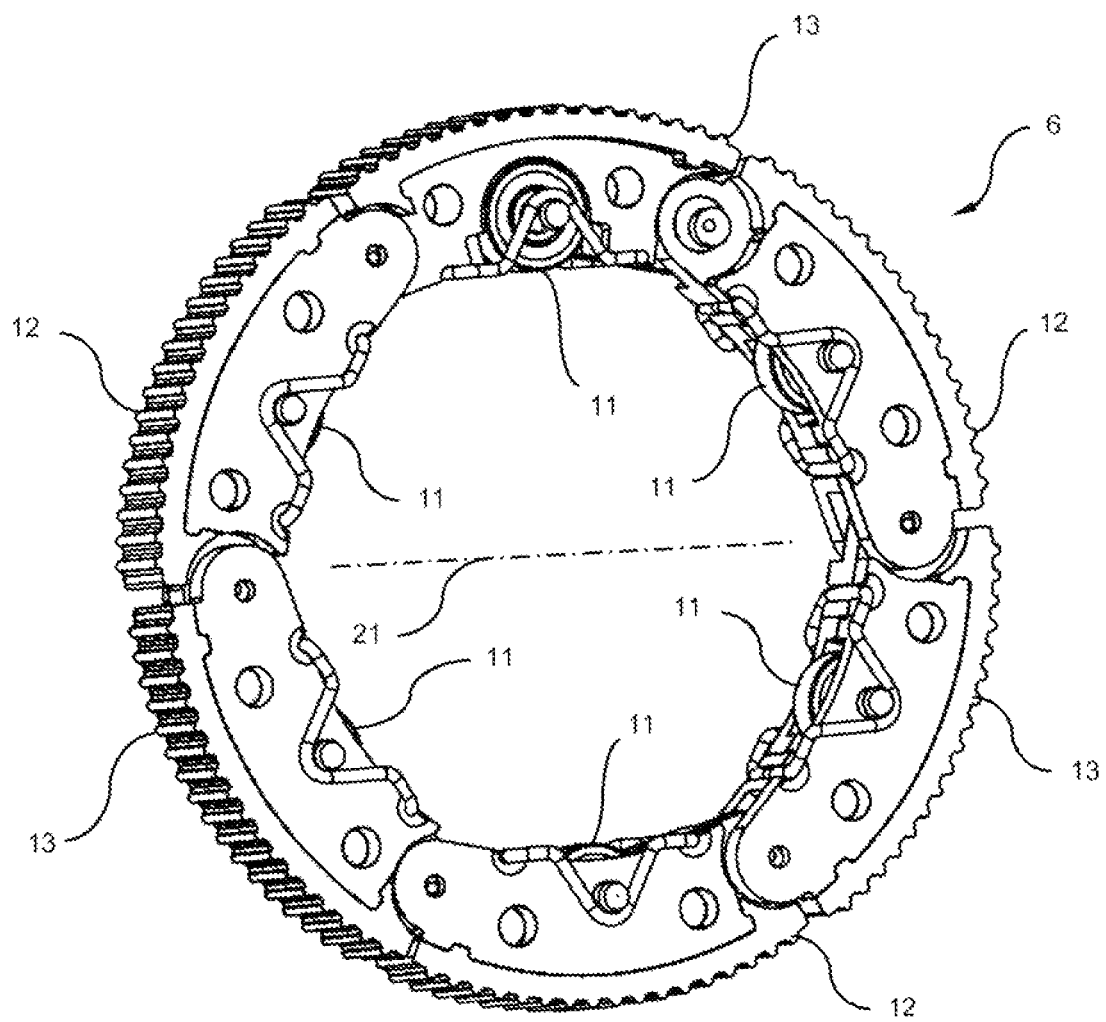
FIG. 14 shows a perspective detailed view of the second gearing element of the eccentric gearing according to the invention of FIG. 12.

In the embodiment in FIGS. 2 to 11, the four gear rims 6.1 to 6.4 each form a second gearing element 6 in the sense of the present application. The gear rims 6.1 to 6.4 are rigid, i. e. the gear rims 6.1 to 6.4 are not deformed by the first gearing element. FIGS. 12 to 14 show a third embodiment of the present invention wherein the four gear rims are replaced by one single gear rim 6. As FIG. 14 and the alternative embodiment in FIG. 13 show, the gear rim is composed of a plurality of segments 12 and 13 permitting a design free of unbalances. Reference numeral 21 designates the axis of the gear rim 6. At the gear rim 6, altogether six rollers 11 mounted in a rotatable manner are attached which are arranged so as to be uniformly distributed in the circumferential direction in relation to the axis 21 and roll at altogether six contact points directly on the outer contour 4 of the first gearing element shown in FIG. 12. In this embodiment, too, the gear rim 6 is rigid and therefore does not undergo any deformation in case of a contact of the contact points on the outer contour 4 of the first gearing element. In this embodiment, the outer contour 4 of the first gearing element 2 therefore comprises altogether five cams arranged so as to be uniformly distributed in the circumferential direction. Here, too, a rotation of the first gearing element 2 about the first axis leads to a rotation of the gear rim 6, i. e. the second gearing element, about the axis 21 of the gear rim 6, i. e. about the second axis, and thereby also to a rotation of the second axis 21 about the first axis 3.

In the shown exemplary embodiments, every second gearing element comprises exactly N+1 contact points, wherein N is the number of cams of the first gearing element protruding radially in relation to the first axis.

LIST OF REFERENCE NUMERALS 1 eccentric gearing
2 first gearing element
3 first axis
4 outer contour
3 cam
6 second gearing element
6.1 gear rim
6.2 gear rim
6.3 gear rim
6.4 gear rim
7 contact point
8 contact cam
9 elastically deformable sleeve
10 rolling element
11 roller
12 segment
13 segment
14 ring gear
15 support
16 pin
17 bore
18 housing
19 cylindrical bolt
20 marking point
21 second axis
N number

The invention claimed is:

1. Eccentric gearing comprising:
a first gearing element, which has a first axis and an outer contour having at least two cams protruding radially in relation to the first axis;
a second gearing element, which has a second axis which is constantly held eccentrically in relation to the first axis, wherein the first gearing element is mounted in a rotatable manner about the first axis relative to the second gearing element, and wherein the second gearing element is supported on the outer contour of the first gearing element such that a rotation of the first gearing element about the first axis will effect a rotation of the second axis of the second gearing element about the first axis, and
wherein the at least two cams is a number N of cams, which cams are arranged so as to be distributed uniformly in a circumferential direction in relation to the first axis, wherein the second gearing element is supported at N+1 point contacts on the outer contour of the first gearing element.

2. Eccentric gearing according to claim 1, wherein the outer contour of the first gearing element is formed by a closed trochoid with N cycles.

3. Eccentric gearing according to claim 2, wherein the second gearing element comprises:
N+1 contact cams which are arranged so as to be uniformly distributed in the circumferential direction in relation to the second axis of the second gearing element and point towards the second axis, wherein the second gearing element is supported on the outer contour of the first gearing element via the contact cams in N+1 point contacts.

4. Eccentric gearing according to claim 2, wherein the eccentric gearing comprises:
N+1 rollers mounted to be rotatable at the second gearing element which are arranged so as to be uniformly distributed in the circumferential direction in relation to the second axis of the second gearing element, and roll directly on the outer contour of the first gearing element at the point contacts.

5. Eccentric gearing according to claim 1, wherein the second gearing element comprises:
N+1 contact cams which are arranged so as to be uniformly distributed in the circumferential direction in relation to the second axis of the second gearing element and point towards the second axis, wherein the second gearing element is supported on the outer contour of the first gearing element via the contact cams in N+1 point contacts.

6. Eccentric gearing according to claim 5, wherein the contact cams comprise, at least in a region where the corresponding point contact can come to rest:
a circular contour convex with respect to the second axis.

7. Eccentric gearing according to claim 6, wherein the outer contour of the first gearing element is surrounded by an elastically deformable sleeve which is mounted in a rotatable manner with respect to the first gearing element via a plurality of rolling elements arranged between the first gearing element and the sleeve, wherein the contact cams abut against an outer circumference of the sleeve in the point contacts, so that the second gearing element is supported on the outer contour of the first gearing element indirectly via the contact cams.

8. Eccentric gearing according to claim 5, wherein the outer contour of the first gearing element is surrounded by an elastically deformable sleeve which is mounted in a rotatable manner with respect to the first gearing element via a plurality of rolling elements arranged between the first gearing element and the sleeve, wherein the contact cams abut against an outer circumference of the sleeve in the point contacts, so that the second gearing element is supported on the outer contour of the first gearing element indirectly via the contact cams.

9. Eccentric gearing according to claim 1, wherein the eccentric gearing comprises:
   N+1 rollers mounted to be rotatable at the second gearing element which are arranged so as to be uniformly distributed in the circumferential direction in relation to the second axis of the second gearing element, and roll directly on the outer contour of the first gearing element at the point contacts.

10. Eccentric gearing according to claim 9, wherein the second gearing element is composed of a plurality of segments.

11. Eccentric gearing according to claim 10, wherein the number N corresponds to the number two.

12. Eccentric gearing according to claim 11, wherein the second gearing element is a gear rim comprising:
   a toothing with a first pitch which engages in a toothing of a ring gear with a second pitch, the first pitch being larger than the second pitch.

13. Eccentric gearing according to claim 1, wherein the number N corresponds to the number two.

14. Eccentric gearing according to claim 1, wherein the second gearing element is a gear rim comprising:
   a toothing with a first pitch which engages in a toothing of a ring gear with a second pitch, the first pitch being larger than the second pitch.

15. Eccentric gearing according to claim 14, wherein the eccentric gearing comprises:
   four gear rims arranged axially which are each supported on the outer contour of the first gearing element at N+1 point contacts, wherein the second axes of the two outer gear rims are offset in relation to the first axis of the first gearing element by 180° with respect to the second axes of the two central gear rims.

16. Eccentric gearing according to claim 15, wherein the gear rim is made of steel or ceramics.

17. Eccentric gearing according to claim 16, wherein a rotation of the first gearing element about the first axis will effect a rotation of the second gearing element about the second axis.

18. Eccentric gearing according to claim 14, wherein the gear rim is made of steel or ceramics.

19. Eccentric gearing according to claim 1, wherein a rotation of the first gearing element about the first axis will effect a rotation of the second gearing element about the second axis.

20. Eccentric gearing according to claim 1, wherein the second gearing element is configured to be rigid.

\* \* \* \* \*